Patented Oct. 31, 1922.

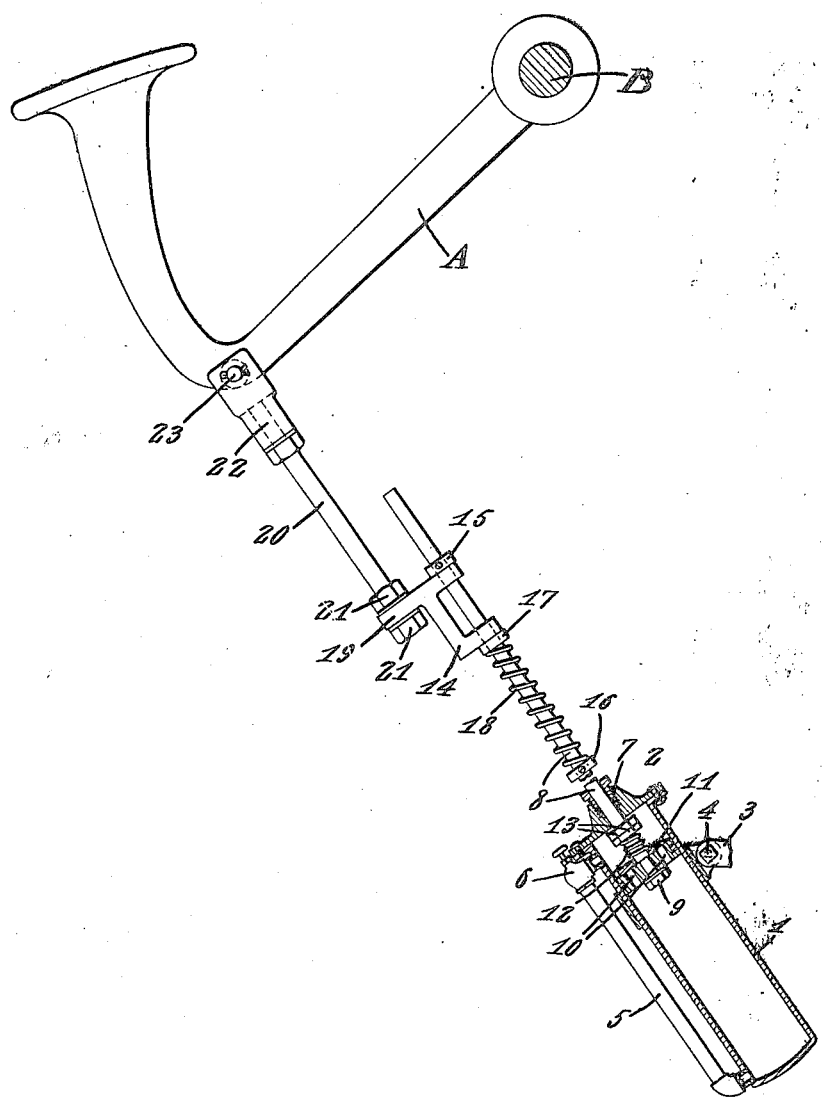

1,433,805

UNITED STATES PATENT OFFICE.

JOHN H. DEPPE, OF ASHEVILLE, NORTH CAROLINA.

ATTACHMENT FOR CLUTCH-CONTROL PEDALS.

Application filed June 23, 1921. Serial No. 479,831.

*To all whom it may concern:*

Be it known that I, JOHN H. DEPPE, a citizen of the United States, residing at Asheville, in the county of Buncombe and State of North Carolina, have invented a new and useful Attachment for Clutch-Control Pedals, of which the following is a specification.

This invention relates to a cushioning attachment for use in connection with the clutch pedal of an automobile. One of its objects is to provide a device of this character which can be connected readily to the pedal of any automobile, and which will allow the pedal to be depressed easily, but when the pedal is released, will accelerate its return to a given point, where the driving member of the clutch begins to engage with the driven member, after which it will retard the return to initial position with a cushioning effect, during the active engagements of the two members. Thus there is practically eliminated the unnecessary annoyance of choking the motor, and undue stress or strain on the gears, axles, and other mechanical parts of the automobile is entirely eliminated, as also the undue wear on the tires, all of which is caused by the sudden application of the power to the driven parts of the automobile through the sudden engagement of the clutch.

Another object is to provide a device of this character which can be installed and adjusted readily to any make automobile with any type clutch, the same occupying very little room.

With the foregoing and other objects in view which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawing, which is a view partly in elevation and partly in section, the invention has been shown combined with a clutch pedal.

Referring to the figure by characters of reference, A designates the clutch pedal of an automobile mounted in a shaft B as ordinarily.

The attachment constituting the present invention includes a cylinder 1 having a detachable head 2 at one end and which cylinder is adapted to be connected by any suitable means indicated generally at 3 to a part of the vehicle structure so that the cylinder will thus be held securely in position although capable of a slight swinging movement about its pivotal connection 4. The cylinder has a bypass 5 opening into the end portions thereof and provided with a valve 6 whereby the flow of fluid through the bypass can be controlled.

A packing gland 7 is arranged within the head 2 and slidably mounted therein is a rod 8 which projects into the cylinder and is secured to a piston 9 having openings 10 therethrough. A disk valve 11 is pressed against one face of the piston by a spring 12 which bears against a nut 13 or the like on the rod 8. Thus the disk valve is normally seated to close the openings 10 but will open automatically when the piston is thrust toward one end of the cylinder.

The rod 8 is slidably mounted within a yoke 14 and adjustably mounted on this rod at opposite sides of the yoke are collars 15 and 16. Another collar 17 is slidable on the rod and bears against one end of the yoke, this collar constituting an abutment for one end of a coiled spring 18 the other end of which bears against the collar 16.

An ear 19 extends from the yoke and is engaged by one end of a rod 20 fastened thereto by nuts 21 or the like. The other end of the rod has a head 22 which is pivotally connected to the clutch pedal A as shown at 23.

It will be apparent that when the clutch pedal is depressed the yoke 14 will thrust against the coiled spring 18 which in turn will thrust against collar 16 and cause the piston 9 to move downwardly within the cylinder 1 until it reaches the downward limit of its movement. Then the yoke 14 begins to slide down on rod 8, compressing coiled spring 18. Thus when the pedal is released the spring will accelerate its return to the point where the clutch members begin to engage, after which the sliding yoke 14 comes against collar 15, which is made fast to rod 8 at this point, and returns gradually until the clutch members are fully engaged. This engagement will not be with a jerk, as ordinarily, because the yoke 14 will pull upwardly on collar 15, thus causing the piston 9 to thrust against the fluid or air in the path thereof and which fluid or air can only pass through bypass 5.

What is claimed is:—

1. The combination with the clutch pedal of a motor vehicle, of controlling means therefor including a cylinder having a longitudinal bypass, a valved piston mounted for reciprocation within the cylinder, a rod extending from the piston, a yoke slidable on the rod, collars adjustably connected to the rod, a spring on the rod and interposed between the yoke and one of the collars for receiving the thrust from the yoke, the other collar constituting an abutment for the yoke, and a connection between the yoke and pedal.

2. The combination with a clutch pedal of a motor vehicle, of means for controlling the return movement of the pedal, said means including a cylinder having a bypass, a piston in the cylinder, a valve thereon adapted to open during the movement of the piston in one direction, a rod upon the piston, collars adjustably connected to the rod, a yoke slidable on the rod and between the collars, a spring interposed between the yoke and one of the collars for transmitting thrusts from the yoke to the piston to move the piston in one direction and open the valve, and a rod connecting the yoke to the pedal.

In testimony that I claim the foregoing as my own, I have hereto affixed my signature in the presence of two witnesses.

JOHN H. DEPPE.

Witnesses:
J. P. KITCHEN,
GEORGIE McMINN.